United States Patent
Kanazawa

(10) Patent No.: US 11,023,658 B2
(45) Date of Patent: Jun. 1, 2021

(54) IMAGE FORMING APPARATUS, IMAGE FORMING METHOD, AND NON-TRANSITORY COMPUTER READABLE RECORDING MEDIUM

(71) Applicant: KYOCERA DOCUMENT SOLUTIONS INC., Osaka (JP)

(72) Inventor: Keizen Kanazawa, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/424,820

(22) Filed: May 29, 2019

(65) Prior Publication Data
US 2020/0380069 A1 Dec. 3, 2020

(51) Int. Cl.
G06F 40/126 (2020.01)
G06F 40/109 (2020.01)
B41J 5/44 (2006.01)
G06F 3/12 (2006.01)

(52) U.S. Cl.
CPC .............. *G06F 40/126* (2020.01); *B41J 5/44* (2013.01); *G06F 3/12* (2013.01); *G06F 40/109* (2020.01)

(58) Field of Classification Search
CPC ................................ G06F 17/00; G06F 40/109
See application file for complete search history.

(56) References Cited

U.S. PATENT DOCUMENTS

| 5,233,685 A | * | 8/1993 | Landes et al. .......... G06F 15/62 |
| 5,506,940 A | * | 4/1996 | Bamford et al. |
| 5,825,987 A | * | 10/1998 | Asada ..................... G06K 15/00 |
| 2003/0002063 A1 | * | 1/2003 | Oomura et al. ........ G06F 17/21 |
| 2014/0049554 A1 | * | 2/2014 | Chen et al. .............. G09G 5/02 |
| 2017/0344519 A1 | * | 11/2017 | Scott et al. ............. G06F 17/21 |

FOREIGN PATENT DOCUMENTS

JP 2003-044468 A 2/2003
JP 2016-192174 A 11/2016

* cited by examiner

*Primary Examiner* — James J Debrow
(74) *Attorney, Agent, or Firm* — Li & Cai Intellectual Property (USA) Office

(57) ABSTRACT

An image forming apparatus includes a controller circuit configured to execute an information processing program to operate as a rendering module, the rendering module being configured to determine, with reference to the character code table, whether or not a specified character code is supported by a specified font, the specified character code being the character code in the printable data, the specified font being a font specified by the font specifying information, if determining that the specified character code is an unsupported character code, the unsupported character code being a character code unsupported by the specified font, determine, with reference to the character code table, whether or not there is an alternative font, the alternative font being a font that supports the unsupported character code, and if determining that there is the alternative font, render a character specified by the unsupported character code by using the alternative font.

8 Claims, 5 Drawing Sheets

| Font | Monospaced/ proportional | Serif/sans-serif | Italics | Boldface |
|---|---|---|---|---|
| Arial | Proportional | Sans-serif | Support | Support |
| Courier | Monospaced | Serif | Support | Support |
| LetterGothic | Monospaced | Sans-serif | Support | Support |
| CGTimes | Proportional | Serif | Support | Support |
| UniversMedium | Proportional | Sans-serif | Support | Support |
| ... | ... | ... | ... | ... |

FIG.3

IMAGE FORMING APPARATUS, IMAGE FORMING METHOD, AND NON-TRANSITORY COMPUTER READABLE RECORDING MEDIUM

BACKGROUND OF THE INVENTION

1. Field of the Invention

The present disclosure relates to an image forming apparatus that renders characters specified by character codes in printable data, an image forming method, and a non-transitory computer readable recording medium that records an information processing program.

2. Description of Related Art

There is known an image forming apparatus that renders characters specified by character codes in printable data received from a host device by using a font specified in the printable data.

SUMMARY OF THE INVENTION

According to an embodiment of the present disclosure, there is provided an image forming apparatus, including:
a memory configured to store character code tables, each of the character code tables storing multiple character codes supported by each of multiple fonts;
a communication interface configured to receive printable data from a host device, the printable data including font specifying information and a character code; and
a controller circuit configured to execute an information processing program to operate as a rendering module,
the rendering module being configured to
determine, with reference to the character code table, whether or not a specified character code is supported by a specified font, the specified character code being the character code in the printable data, the specified font being a font specified by the font specifying information,
if determining that the specified character code is an unsupported character code, the unsupported character code being a character code unsupported by the specified font,
determine, with reference to the character code table, whether or not there is an alternative font, the alternative font being a font that supports the unsupported character code, and
if determining that there is the alternative font, render a character specified by the unsupported character code by using the alternative font.

According to an embodiment of the present disclosure, there is provided an image forming method for an image forming apparatus including
a memory configured to store character code tables, each of the character code tables storing multiple character codes supported by each of multiple fonts,
a communication interface configured to receive printable data from a host device, the printable data including font specifying information and a character code, and
a controller circuit configured to execute an information processing program to operate as a rendering module,
the image forming method including:
by the rendering module of the image forming apparatus, determining, with reference to the character code table, whether or not a specified character code is supported by a specified font, the specified character code being the character code in the printable data, the specified font being a font specified by the font specifying information;
if determining that the specified character code is an unsupported character code, the unsupported character code being a character code unsupported by the specified font,
determining with reference to the character code table, whether or not there is an alternative font, the alternative font being a font that supports the unsupported character code; and
if determining that there is the alternative font, rendering a character specified by the unsupported character code by using the alternative font.

According to an embodiment of the present disclosure, there is provided a non-transitory computer readable recording medium that records an information processing program executable by an image forming apparatus including
a memory configured to store character code tables, each of the character code tables storing multiple character codes supported by each of multiple fonts,
a communication interface configured to receive printable data from a host device, the printable data including font specifying information and a character code, and
a controller circuit configured to execute an information processing program to operate as a rendering module,
the information processing program causing the controller circuit of the image forming apparatus to operate as a rendering module,
the rendering module being configured to
determine, with reference to the character code table, whether or not a specified character code is supported by a specified font, the specified character code being the character code in the printable data, the specified font being a font specified by the font specifying information,
if determining that the specified character code is an unsupported character code, the unsupported character code being a character code unsupported by the specified font,
determine, with reference to the character code table, whether or not there is an alternative font, the alternative font being a font that supports the unsupported character code, and
if determining that there is the alternative font, render a character specified by the unsupported character code by using the alternative font.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows an example of a structure of the font attribute table.

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
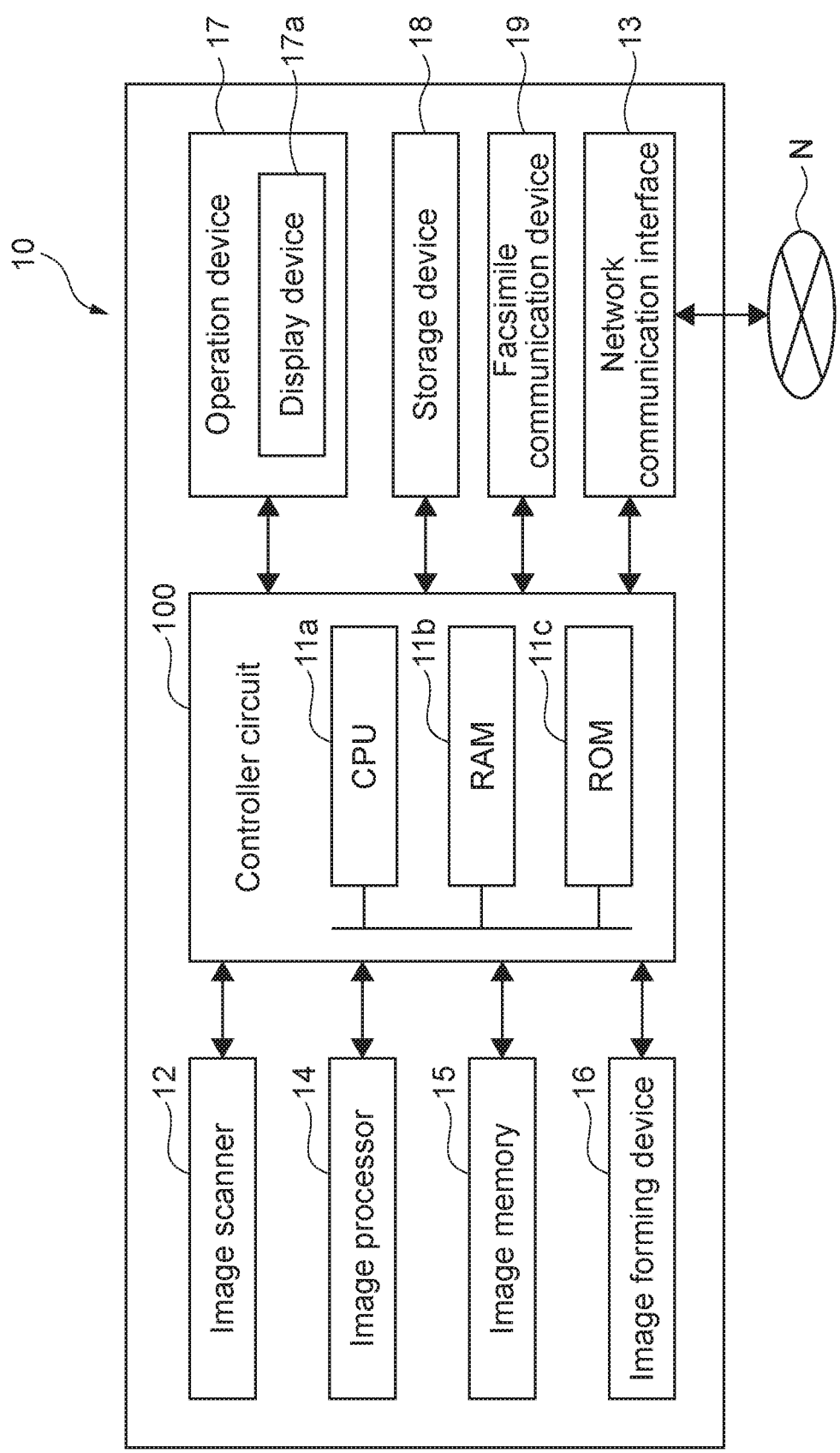
FIG. 1 shows a hardware configuration of an image forming apparatus of an embodiment of the present disclosure.

FIG. 1 shows a hardware configuration of an image forming apparatus according to an embodiment of the present disclosure.

The image forming apparatus 10 includes the controller circuit 100. The controller circuit 100 includes the CPU (Central Processing Unit) 11a (processor), the RAM (Random Access Memory) 11b, the ROM (Read Only Memory) 11c (memory), dedicated hardware circuits, and the like and performs overall operational control of the image forming apparatus 10. The CPU 11a loads information processing programs (including image processing program) stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 including the display device 17a (touch panel) is an embodiment of an input device. A sound input device including a microphone may be provided as an input device.

2. Functional Configuration of Image Forming Apparatus

Figure 2:
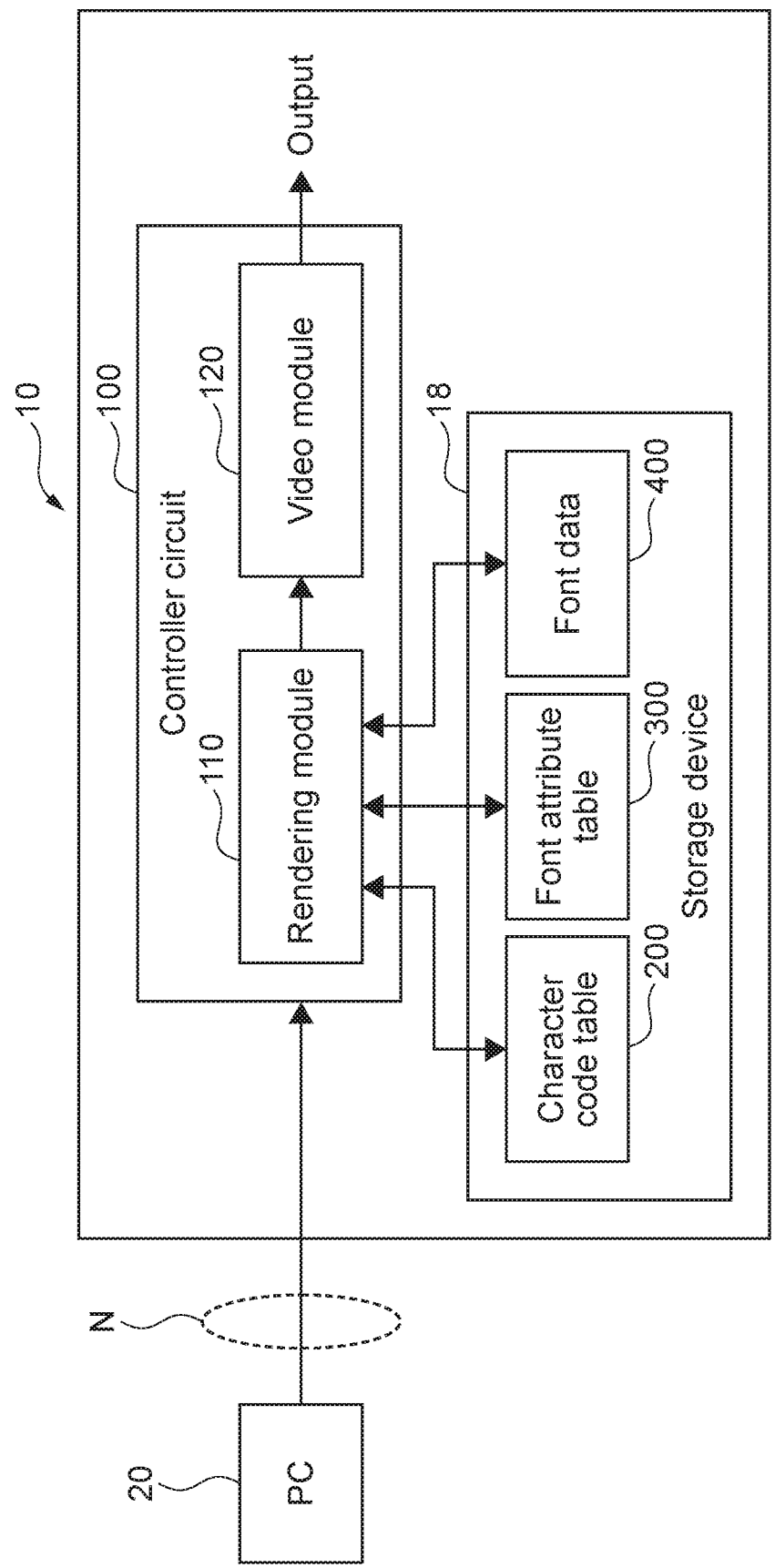
FIG. 2 shows a functional configuration of the image forming apparatus.

FIG. 2 shows a functional configuration of the image forming apparatus.

In the controller circuit 100 of the image forming apparatus 10, the CPU 11a loads an image processing program stored in the ROM 11c in the RAM 11b and executes the image processing program to thereby operate as the rendering module 110 and the video module 120.

The storage device 18 stores the character code tables 200, the font attribute table 300, and the font data 400.

The font data 400 is resident font data (for example, Arial font) used to render each font.

The character code tables 200 correspond to multiple types of the font data 400 one by one. For example, the storage device 18 stores one character code table 200 of the font "Arial", and another character code table 200 of the font "Univers Medium". The character code table 200 records multiple character codes uniquely identifying multiple characters of the font one by one. In other words, the character code table 200 stores the multiple character codes supported by the font.

The font attribute table 300 stores a character attribute and a rendering attribute of each font.

3. Example of Font Attribute Table

FIG. 3 shows an example of a font attribute table.

The font attribute table 300 stores the character attribute 310 and the rendering attribute 320 of each of the multiple fonts 301. The character attribute 310 means an attribute of a character style. The rendering attribute 320 means an attribute of a rendering style of characters. The character attribute 310 includes, for example, the monospaced or proportional 311 and the serif or sans-serif 312. The rendering attribute 320 includes, for example, the support/unsupport of italics 321 and the support/unsupport of boldface 322.

For example, the font attribute table 300 stores, in association with the font "Arial" 301, "proportional" 311, "sans-serif" 312, support of italics 321, and support of boldface 322. The font attribute table 300 stores, in association with the font "Courier" 301, "monospaced" 311, "serif" 312, support of italics 321, and support of boldface 322. The font attribute table 300 stores, in association with the font "Letter Gothic" 301, "monospaced" 311, "sans-serif" 312, support of italics 321, and support of boldface 322. The font attribute table 300 stores, in association with the font "CG Times" 301, "proportional" 311, "serif" 312, support of italics 321, and support of boldface 322. The font attribute table 300 stores, in association with the font "Univers Medium" 301, "proportional" 311, "sans-serif" 312, support of italics 321, and support of boldface 322.

4. Operational Flow of Rendering Module

Figure 4:
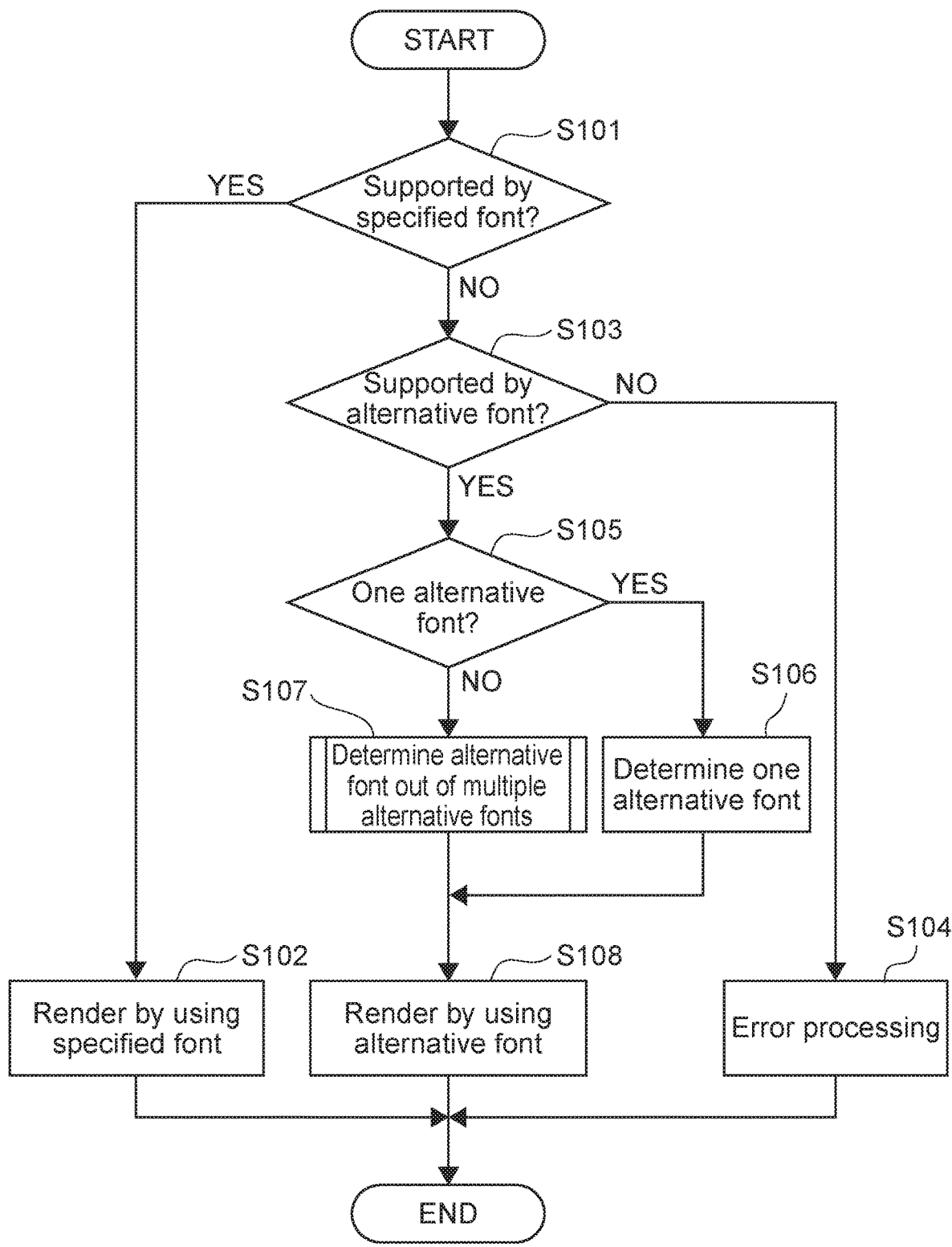
FIG. 4 shows an operational flow of the rendering module.

FIG. 4 shows an operational flow of rendering module.

The image forming apparatus 10 receives printable data from the host device 20 connected to the network N via the network communication interface 13. The printable data is described in, for example, PDL (Page Description Language). The printable data includes font specifying information and character codes. The font specifying information is information specifying a font (Arial, etc.) to be output. The printable data may further include or may not include a rendering attribute (italics, boldface, etc.). The printable data may specify one type of font or two or more types of fonts. If the printable data specifies two or more types of fonts, the rendering module 110 executes the operational flow for each font.

The rendering module 110 determines, with reference to the character code table 200, whether or not the font specified by the font specifying information in the printable data (hereinafter referred to as specified font) supports the character codes (hereinafter referred to as specified character codes) in the printable data (Step S101). Specifically, the rendering module 110 determines whether or not the character code table 200 of the specified font includes all the specified character codes in the printable data.

The rendering module 110 determines that, with reference to the character code table 200, the specified font supports the specified character codes (Step S101, YES). Specifically, the rendering module 110 determines that the character code table 200 of the specified font includes all the specified character codes in the printable data. In this case, the rendering module 110 renders the characters specified by the specified character codes by using the specified font (Step S102). Specifically, the rendering module 110 renders the characters specified by the specified character codes by using the font data 400 of the specified font, and thereby generates rendering data (bitmap data). The rendering module 110 outputs the generated rendering data (bitmap data) to the video module 120.

Meanwhile, the rendering module 110 determines that, with reference to the character code table 200, the specified font does not support at least part of the specified character codes (Step S101, NO). Specifically, the rendering module 110 determines that the character code table 200 of the specified font does not include at least part of the specified character codes in the printable data.

Hereinafter, a specified character code unsupported by the specified font (specified character code not included in the character code table 200 of the specified font) will be referred to as "unsupported character code". A specified character code supported by the specified font (specified character code included in the character code table 200 of the specified font) will be referred to as "supported character code".

In this case, the rendering module 110 determines, with reference to the character code table 200, whether or not there is a font that supports the unsupported character code (hereinafter referred to as alternative font) (Step S103). Specifically, the rendering module 110 determines whether or not any of the character code table 200 of a font except for the specified font includes the unsupported character code. Note that, if there are multiple character code tables 200 including the unsupported character code, the rendering module 110 determines all the character code tables 200. In other words, if there are multiple alternative fonts, the rendering module 110 determines all the multiple alternative fonts.

The rendering module 110 determines that, with reference to the character code table 200, there is no alternative font (Step S103, NO). In other words, the rendering module 110 determines that no character code table 200 includes the unsupported character code. In this case, the rendering module 110 executes an error processing according to the rule of the PDL of the printable data (Step S104). For example, if the PDL of printable data is PCL5, the rendering module 110 uses a "space" instead of the unsupported character code according to the rule of PCL5.

Meanwhile, the rendering module 110 determines that, with reference to the character code table 200, there are one or multiple alternative fonts (Step S103, YES). If there is one alternative font (Step S105, YES), the rendering module 110 determines the one alternative font (Step S106).

Meanwhile, if there are multiple alternative fonts (Step S105, NO), the rendering module 110 determines, with reference to the font attribute table 300, the alternative font out of the multiple alternative fonts, whose attributes are the most closer to the character attribute of the specified font and the rendering attribute in the printable data (hereinafter referred to as specified rendering attribute) (Step S107).

Figure 5:
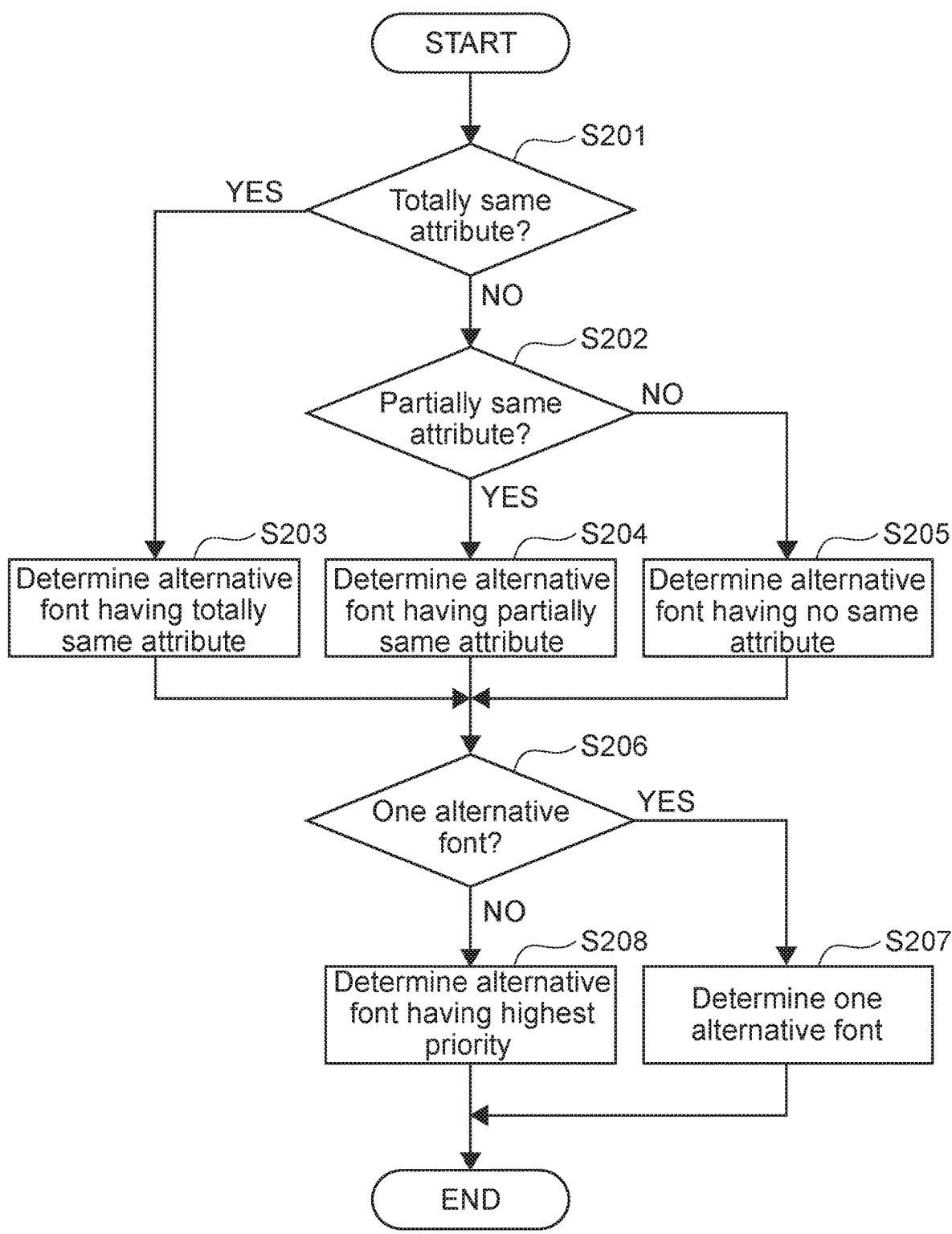
FIG. 5 shows an operational flow of determining the alternative font by the rendering module.

FIG. 5 shows an operational flow of determining the alternative font by the rendering module.

The rendering module 110 determines, with reference to the font attribute table 300, whether or not there is an alternative font (one or multiple), the character attribute 310 of the alternative font being totally the same as the character attribute 310 of the specified font. Note that the printable data may include a specified rendering attribute (italics, boldface, etc.). In this case, the rendering module 110 further determines, with reference to the font attribute table 300, whether or not there is an alternative font (one or multiple), the specified rendering attribute 320 in the printable data being totally the same as the specified rendering attribute 320. In short, the rendering module 110 determines, with reference to the font attribute table 300, whether or not there is an alternative font (one or multiple), the character attribute 310 of the alternative font being totally the same as the character attribute 310 of the specified font, and the specified rendering attribute 320 in the printable data (if printable data includes specified rendering attribute) being totally the same as the specified rendering attribute 320 (Step S201).

If there is an alternative font (one or multiple), the character attribute 310 of the alternative font being totally the same as the character attribute 310 of the specified font, and the specified rendering attribute 320 in the printable data (if printable data includes specified rendering attribute) being totally the same as the specified rendering attribute 320 (Step S201, YES), the rendering module 110 determines the alternative font (one or multiple) (Step S203).

Meanwhile, the rendering module 110 determines that there is no alternative font (one or multiple), the character attribute 310 of the alternative font being totally the same as the character attribute 310 of the specified font, and the specified rendering attribute 320 in the printable data (if printable data includes specified rendering attribute) being totally the same as the specified rendering attribute 320 (Step S201, NO). In this case, the rendering module 110 determines whether or not there is an alternative font (one or multiple), the character attribute 310 of the alternative font being partially the same as the character attribute 310 of the specified font. Note that the printable data may include a specified rendering attribute. In this case, the rendering module 110 determines, with reference to the font attribute table 300, whether or not there is an alternative font (one or multiple), the specified rendering attribute 320 in the printable data being partially the same as the specified rendering attribute 320. In short, the rendering module 110 determines, with reference to the font attribute table 300, whether or not there is an alternative font (one or multiple), the character attribute 310 of the alternative font being partially the same as the character attribute 310 of the specified font, and/or the specified rendering attribute 320 in the printable data (if printable data includes specified rendering attribute) being partially the same as the specified rendering attribute 320 (Step S202). If there is an alternative font (one or multiple), the character attribute 310 of the alternative font being partially the same as the character attribute 310 of the specified font, and/or the specified rendering attribute 320 in the printable data (if printable data includes specified rendering attribute) being partially the same as the specified rendering attribute 320 (Step S202, YES), the rendering module 110 determines the alternative font (one or multiple) (Step S204).

Meanwhile, if there is no alternative font (one or multiple), the character attribute 310 of the alternative font being partially the same as the character attribute 310 of the specified font, and/or the specified rendering attribute 320 in the printable data (if printable data includes specified rendering attribute) being partially the same as the specified rendering attribute 320 (Step S202, NO), the rendering module 110 determines an alternative font (one or multiple), the character attribute 310 of the alternative font being different from the character attribute 310 of the specified font, and the specified rendering attribute 320 in the printable data (if printable data includes specified rendering attribute) being different from the specified rendering attribute 320 (Step S205).

If the rendering module 110 determines one alternative font (Steps S203 and S204, and S205) (Step S206, YES), the rendering module 110 determines the one alternative font (Step S207).

Meanwhile, if the rendering module 110 determines multiple alternative fonts (Steps S203 and S204, and S205) (Step S206, NO), the rendering module 110 determines one alternative font out of the multiple alternative fonts (Step S208). For example, the rendering module 110 may determine one alternative font by using the following method. For example, the font attribute table 300 stores a priority (for example, in the order of the highest frequency of use of the font 301) for each of all the fonts 301. The rendering module 110 may determine the alternative font having the highest priority out of the determined multiple alternative fonts.

With reference to FIG. 4 again, the rendering module 110 renders the unsupported character code (specified character code unsupported by specified font) by using the determined alternative font (Steps S106 and S107) (Step S108). Specifically, the rendering module 110 renders a character specified by the unsupported character code by using the font data 400 of the alternative font, and thereby generates rendering data (bitmap data). The rendering module 110 outputs the generated rendering data (bitmap data) to the video module 120.

Note that the rendering module 110 may render the character specified by the supported character code (specified character code supported by specified font) by using the specified font. In other words, the rendering module 110 may render only the character specified by the unsupported character code by using the alternative font, and may render the characters specified by all the supported character codes by using the specified font.

Alternatively, the rendering module 110 may render the characters specified by the supported character codes by using the alternative font. For example, the rendering module 110 may render the characters specified by all the specified character codes by using the alternative font. Alternatively, the rendering module 110 may render a character string (for example, one word) including the characters specified by the unsupported character codes by using the alternative font.

6. Specific Example

An operational flow of the rendering module 110 will be described according to the following specific example. The font specified by the font specifying information in the printable data (specified font) is "Arial". The character codes (specified character codes) in the printable data are "U+0041", "U+0402", and "U+0042". The character codes "U+0041", "U+0402", and "U+0042" are Unicodes specifying the characters "A", "Ђ", and "B", respectively. The printable data includes no specified rendering attribute (italics, boldface, etc.).

With reference to FIG. 4, the rendering module 110 determines, with reference to the character code table 200 of the specified font "Arial", whether or not the specified font "Arial" supports all the specified character codes "U+0041", "U+0402", and "U+0042" (Step S101). The specified font "Arial" supports the specified character codes "U+0041" and "U+0042" (specifying characters "A" and "B"), but does not support the specified character code "U+0402" (specifying character "Ђ"). So the rendering module 110 determines that the specified font "Arial" supports part of the specified character codes "U+0041" and "U+0042" (supported character codes), but does not support part of the specified character codes "U+0402" (unsupported character code) (Step S101, NO).

The rendering module 110 determines, with reference to the character code table 200, whether or not there is a font (alternative font) that supports the unsupported character code "U+0402" (specifying character "Ђ") (Step S103). The fonts "Courier", "Letter Gothic", "CG Times", and "Univers Medium" support the unsupported character code "U+0402" (specifying character "Ђ") (Step S103, YES). So the rendering module 110 determines that there are multiple alternative fonts "Courier", "Letter Gothic", "CG Times", and "Univers Medium" (Step S105, NO). Then the rendering module 110 determines one alternative font according to the following procedure (Step S107).

With reference to FIG. 5, the rendering module 110 determines, with reference to the font attribute table 300, whether or not there is an alternative font (one or multiple), the character attribute 310 of the alternative font being totally the same as the character attribute 310 of the specified font "Arial" (Step S201).

With reference to FIG. 3, the character attribute 310 of the specified font "Arial" 301 includes "proportional" 311 and "sans-serif" 312. Meanwhile, only the font "Univers Medium" has "proportional" 311 and "sans-serif" 312 as the character attribute 310 out of the multiple alternative fonts "Courier", "Letter Gothic", "CG Times", and "Univers Medium".

Therefore the rendering module 110 determines, with reference to the font attribute table 300, the alternative font "Univers Medium", the character attribute 310 of the alternative font "Univers Medium" being totally the same as the character attribute 310 of the specified font "Arial" (Step S201, YES). So the rendering module 110 determines the alternative font "Univers Medium" (Step S203). There is one alternative font "Univers Medium" (Step S206, YES). So the rendering module 110 finally determines the one alternative font "Univers Medium" (Step S207).

With reference to FIG. 4 again, the rendering module 110 renders the unsupported character code "U+0402" (specifying character "Ђ") by using the determined alternative font "Univers Medium" (Step S107) (Step S108). Specifically, the rendering module 110 renders the character "Ђ" specified by the unsupported character code "U+0402" by using the font data 400 of the alternative font "Univers Medium", and thereby generates rendering data (bitmap data). The rendering module 110 outputs the generated rendering data (bitmap data) to the video module 120.

Note that the rendering module 110 may render the characters "A" and "B" specified by the supported character codes "U+0041" and "U+0042" by using the specified font "Arial". In other words, the rendering module 110 may render only the character "Ђ" specified by the unsupported character code "U+0402" by using the alternative font "Univers Medium", and may render the characters "A" and "B" specified by the supported character codes "U+0041" and "U+0042" by using the specified font "Arial".

Alternatively, the rendering module 110 may render the characters "A" and "B" specified by the supported character codes "U+0041" and "U+0042" by using the alternative font "Univers Medium".

7. Conclusion (1) According to the present embodiment, if character codes (specified character codes) in printable data are character codes unsupported by the font (specified font) specified by the font specifying information (unsupported character code) (Step S101, NO), the rendering module 110 renders the characters specified by the unsupported character codes by using an alternative font (Step S108). As a result, the characters specified by the unsupported character codes are rendered even if it is actually not possible to render those characters by using the specified font.

(2) According to the present embodiment, if there are multiple alternative fonts (Step S105, NO), the rendering module 110 renders the characters specified by the unsupported character codes by using the alternative font, a character attribute of the alternative font being totally or partially same as a character attribute of the specified font (Steps S203 and S204). As a result, the characters specified by the unsupported character codes are rendered by using the alternative font, whose character attribute (style) is closer to that of the specified font, even if it is actually not possible to render those characters by using the specified font.

(3) According to the present embodiment, if there are multiple alternative fonts (Step S105, NO), the rendering module 110 renders the characters specified by the unsupported character codes by using the alternative font, a rendering attribute of the alternative font being totally or partially same as a rendering attribute in the printable (Steps S203 and S204). As a result, the characters specified by the unsupported character codes are rendered by using the alternative font, whose rendering attribute is closer to the rendering attribute in the printable data, even if it is actually not possible to render those characters by using the specified font.

(4), (5) According to the present embodiment, if there are multiple alternative fonts (Step S206, NO), the rendering module 110 renders the characters specified by the unsupported character codes by using the alternative font having the highest priority (Step S208). As a result, the characters specified by the unsupported character codes are rendered by using, for example, an appropriate alternative font such as an alternative font whose frequency of use is high.

(6) According to the present embodiment, the rendering module 110 may render the characters specified by the supported character codes by using the specified font. As a result, only the characters specified by the unsupported character codes are rendered by using the alternative font. The characters specified by the supported character codes are rendered by using the specified font. As a result, the output result is close to the output result that a user wants.

(7) According to the present embodiment, the rendering module 110 may render the characters specified by the supported character codes by using the alternative font. As a result, a character string (for example, one word) including the characters specified by the unsupported character codes or all the character strings included in a document are rendered by using the alternative font. As a result, a uniform output result may be obtained.

(8) According to the present embodiment, the character attribute 310 stored in the font attribute table 300 includes the monospaced or proportional 311 and the serif or sans-serif 312. As a result, the characters specified by the unsupported character codes are rendered by using the alternative font, whose character attribute 310 (character style) is closer to that of the specified font, even if it is actually not possible to render those characters by using the specified font. As a result, the output result is close to the style of the font that a user wants. The user may not feel strange when the user sees the output result.

(9) According to the present embodiment, the rendering attribute 320 stored in the font attribute table 300 includes the support/unsupport of italics 321 and the support/unsupport of boldface 322. As a result, the characters specified by the unsupported character codes are rendered by using the alternative font, whose rendering attribute is closer to the rendering attribute in the printable data, even if it is actually not possible to render those characters by using the specified font. As a result, the output result is close to rendering style that a user wants. The user may not feel strange when the user sees the output result.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
   a memory configured to store
      character code tables, each of the character code tables storing multiple character codes supported by each of multiple fonts, and
      a font attribute table, the font attribute table storing a character attribute of each of the multiple fonts, a rendering attribute of each of the multiple alternative fonts, and a priority of each of the multiple fonts, the priority being an order of a frequency of use of each of the multiple alternative fonts, and
   a communication interface configured to receive printable data from a host device, the printable data including font specifying information, a character code, and a specified rendering attribute, the specified rendering attribute being the rendering attribute in the printable data; and
   a controller circuit configured to execute an information processing program to operate as a rendering module,
   the rendering module being configured to
      determine, with reference to the character code table, whether or not a specified character code is supported by a specified font, the specified character code being the character code in the printable data, the specified font being a font specified by the font specifying information,
      if determining that the specified character code is an unsupported character code, the unsupported character code being a character code unsupported by the specified font,
      determine, with reference to the character code table, whether or not there is an alternative font, the alternative font being a font that supports the unsupported character code, and
      if determining that there is the alternative font, render a character specified by the unsupported character code by using the alternative font, wherein
   the rendering module is further configured to
      (i) if determining that there are multiple alternative fonts,
      determine an alternative font out of the multiple alternative fonts, with reference to the character attribute and the rendering attribute of each of the multiple alternative fonts stored in the font attribute table, a character attribute of the alternative font being at least partially same as a character attribute of the specified font, a rendering attribute of the alternative font being at least partially same as the specified rendering attribute, and render the character specified by the unsupported character code by using the determined alternative font, and (ii) if still multiple alternative fonts are determined, determine an alternative font having a highest priority out of the multiple alternative fonts, with reference to the priority of each of the multiple fonts stored in the font attribute table, the alternative font having the highest priority being an alternative font of a highest frequency of use, and render the character specified by the unsupported character code by using the determined alternative font.

2. The image forming apparatus according to claim 1, wherein
the printable data includes multiple specified character codes,
the rendering module is further configured to
if, with reference to the character code table, determining that part of the specified character codes in the printable data is a supported character code and determining that part of rest of the specified character codes is the unsupported character code, the supported character code being a character code supported by the specified font,
render a character string of a word including a character specified by the unsupported character code by using the alternative font, and
render rest character strings by using the specified font.

3. The image forming apparatus according to claim 1, wherein
the printable data includes multiple specified character codes,
the rendering module is further configured to
if, with reference to the character code table, determining that part of the specified character codes in the printable data is a supported character code and determining that part of rest of the specified character codes is the unsupported character code, the supported character code being a character code supported by the specified font,
render a character specified by the supported character code by using the specified font, and
render a character specified by the unsupported character code by using the alternative font.

4. The image forming apparatus according to claim 1, wherein
the printable data includes multiple specified character codes,
the rendering module is further configured to
if, with reference to the character code table, determining that part of the specified character codes in the printable data is a supported character code and determining that part of rest of the specified character codes is the unsupported character code, the supported character code being a character code supported by the specified font,
render a character specified by the supported character code and a character specified by the unsupported character code by using the alternative font.

5. The image forming apparatus according to claim 1, wherein
the character attribute stored in the font attribute table includes monospaced or proportional, and serif or sans-serif.

6. The image forming apparatus according to claim 1, wherein
the character attribute stored in the font attribute table includes support/unsupport of italics, and support/unsupport of boldface.

7. An image forming method for an image forming apparatus including
a memory configured to store
character code tables, each of the character code tables storing multiple character codes supported by each of multiple fonts, and
a font attribute table, the font attribute table storing a character attribute of each of the multiple fonts, a rendering attribute of each of the multiple alternative fonts, and a priority of each of the multiple fonts, the priority being an order of a frequency of use of each of the multiple alternative fonts, and
a communication interface configured to receive printable data from a host device, the printable data including font specifying information, a character code, and a specified rendering attribute, the specified rendering attribute being the rendering attribute in the printable data, and
a controller circuit configured to execute an information processing program to operate as a rendering module,
the image forming method comprising:
by the rendering module of the image forming apparatus,
determining, with reference to the character code table, whether or not a specified character code is supported by a specified font, the specified character code being the character code in the printable data, the specified font being a font specified by the font specifying information;
if determining that the specified character code is an unsupported character code, the unsupported character code being a character code unsupported by the specified font,
determining with reference to the character code table, whether or not there is an alternative font, the alternative font being a font that supports the unsupported character code; and
if determining that there is the alternative font, rendering a character specified by the unsupported character code by using the alternative font, wherein
the image forming method further comprises:
by the rendering module of the image forming apparatus,
(i) if determining that there are multiple alternative fonts,
determining an alternative font out of the multiple alternative fonts, with reference to the character attribute and the rendering attribute of each of the multiple alternative fonts stored in the font attribute table, a character attribute of the alternative font being at least partially same as a character attribute of the specified font, a rendering attribute of the alternative font being at least partially same as the specified rendering attribute, and
rendering the character specified by the unsupported character code by using the determined alternative font; and
(ii) if still multiple alternative fonts are determined, determining an alternative font having a highest priority out of the multiple alternative fonts, with reference to the priority of each of the multiple fonts stored in the font attribute table, the alternative font having the highest priority being an alternative font of a highest frequency of use, and rendering the character specified by the unsupported character code by using the determined alternative font.

8. A non-transitory computer readable recording medium that records an information processing program executable by an image forming apparatus including
   a memory configured to store
      character code tables, each of the character code tables storing multiple character codes supported by each of multiple fonts, and
      a font attribute table, the font attribute table storing a character attribute of each of the multiple fonts, a rendering attribute of each of the multiple alternative fonts, and a priority of each of the multiple fonts, the priority being an order of a frequency of use of each of the multiple alternative fonts, and
   a communication interface configured to receive printable data from a host device, the printable data including font specifying information, a character code, and a specified rendering attribute, the specified rendering attribute being the rendering attribute in the printable data, and
   a controller circuit configured to execute an information processing program to operate as a rendering module,
   the information processing program causing the controller circuit of the image forming apparatus to operate as a rendering module,
   the rendering module being configured to
      determine, with reference to the character code table, whether or not a specified character code is supported by a specified font, the specified character code being the character code in the printable data, the specified font being a font specified by the font specifying information,
      if determining that the specified character code is an unsupported character code, the unsupported character code being a character code unsupported by the specified font,
      determine, with reference to the character code table, whether or not there is an alternative font, the alternative font being a font that supports the unsupported character code, and
      if determining that there is the alternative font, render a character specified by the unsupported character code by using the alternative font, wherein
   the rendering module is further configured to
     (i) if determining that there are multiple alternative fonts,
     determine an alternative font out of the multiple alternative fonts, with reference to the character attribute and the rendering attribute of each of the multiple alternative fonts stored in the font attribute table, a character attribute of the alternative font being at least partially same as a character attribute of the specified font, a rendering attribute of the alternative font being at least partially same as the specified rendering attribute, and
     render the character specified by the unsupported character code by using the determined alternative font, and
     (ii) if still multiple alternative fonts are determined,
     determine an alternative font having a highest priority out of the multiple alternative fonts, with reference to the priority of each of the multiple fonts stored in the font attribute table, the alternative font having the highest priority being an alternative font of a highest frequency of use, and
     render the character specified by the unsupported character code by using the determined alternative font.

* * * * *